3,636,226
TREATMENT OF ADENOVIRUS INFECTIONS
Denis J. Bauer, London, England, assignor to
Burroughs Wellcome Co.
No Drawing. Filed Sept. 11, 1967, Ser. No. 666,976
Int. Cl. A61k 27/00
U.S. Cl. 424—274                                         4 Claims

ABSTRACT OF THE DISCLOSURE

A method of both treating and preventing adenovirus infections in mammals, which comprises administering to a mammal a therapeutically effective amount of a compound (I)

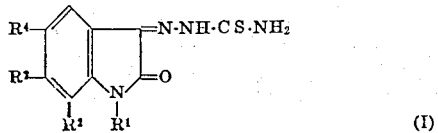

wherein $R^1$ is selected from the class consisting of hydrogen, acetyl, alkyl, alkenyl and alkynyl, having not more than 5 carbon atoms, which may carry substituents elected from the class consisting of halogen and hydroxy which may be esterified with a lower aliphatic carboxylic acid radical having a total of not more than 5 carbon atoms; $R^2$ is selected from the class consisting of hydrogen, halogen and lower alkyl; and $R^1$ and $R^2$ form a trimethylene chain, and $R^3$ and $R^4$ are selected from the class consisting of hydrogen and halogen, at least two of $R^2$, $R^3$ and $R^4$ being hydrogen.

---

This invention relates to isatin β-thiosemicarbazone derivatives having anti-viral activity.

It is already known and published that the β-thiosemicarbazones of isatin and certain substituted isatins are active against pox viruses. For example British patent specification No. 975,357 describes a series of such substituted isatin compounds which are active against vaccinia and alastrim; later clinical work on one of these compounds, N-methyl-isatin β-thiosemicarbazone, has shown that this compound is also prophylactically active against variola major, (Bauer et al., The Lancet, September 1963, 494–496) and further work has shown that it is also useful in the treatment of vaccinial complications. However, published work on the parent member of the series, isatin β-thiosemicarbazone, has shown that although the anti-viral activity can be high against specific viruses in the pox group, the compound is not active against all viruses: for example it is inactive against neurotropic yellow fever, lymphocytic choriomeningitis, dengue, and the N.W.S. strain of influenza virus, although there is low order activity against Rift Valley fever (D. J. Bauer, B. J. Ex Path., 36, (1955) 105–114); even within the pox virus activity is variable and the compound is less active against ectromelia (Bauer & Sheffield, Nature, 184 (1959) 1496–7) and inactive against canary pox (M. Block, Z. Hyg. Infektionkrankh, 143 (1957) 480–9). Further work by the applicants with the isatin β-thiosemicarbazones described in British patent specification No. 975,-357, particularly with N-methylisatin β-thiosemicarbazone in relation to arboviruses, seemed to indicate that high anti-viral activity for this type of compound was limited to activity against viruses of the pox group.

It has now been found that the compounds of Formula I are also active against adenoviruses, and therefore the anti-viral activity spectrum is wider than had previously been suspected.

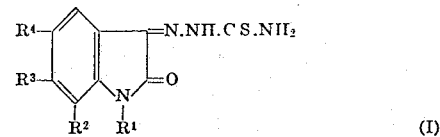

In this formula, $R^1$ is a hydrogen atom or an acetyl group or an alkyl, alkenyl or alkynyl group having not more than 5 carbon atoms which may carry one or more substituents each of which is a halogen atom or a hydroxy group which may be esterified with a lower aliphatic carboxylic acid radical having a total of not more than 5 carbon atoms, $R^2$ is a hydrogen or halogen atom or a methyl or ethyl group, or $R^1$ and $R^2$ form a trimethylene chain, and $R^3$ and $R^4$ are hydrogen or halogen atoms, at least two of $R^2$, $R^3$ and $R^4$ being hydrogen atoms.

The chemical preparation of this type of compound and the physical characteristics of a representative selection of such compounds have already been described in the literature, for example in the above-mentioned British patent, and so this information is not included in this specification.

Adenoviruses are prevalent in nature and in particular they occur in the adenoids, tonsils, upper respiratory tract and eyes in man. They can give rise to symptoms and fevers resembling those of colds and influenza and can cause pharyngitis, virus pneumonia, conjunctivitis and like diseases. Thus, for example, type 8 can cause keratoconjunctivitis, type 3 can cause acute respiratory disease, pharyngoconjunctival fever, acute febrile conjunctivitis, and virus pneumonia in infants. Adenoviruses also exist in animals such as infectious canine hepatitis in dogs.

This invention provides a method of treatment or prevention of adenovirus infections in man and animals which comprises the administration of a compound of Formula I to the infected host.

As described in the following part of the specification the compounds are active in vitro at concentration as low as 5 μM, that is for N-methylisatin β-thiosemicarbazone, a concentration of 11 mg. per litre. Thus if 1 kg. of body weight is taken as equivalent to 1 liter of body fluid this concentration could theoretically be reached by a dose of 11 mg. per kg. or 700 mg. for a 63 kg. human, or if the drug concentrates in the area where the adenoviruses are situated, a dose of say 500 mg. may be active. However, in vitro concentration of 30 μm. are preferred and furthermore the drug is of low solubility and is poorly absorbed. Thus doses of 4.2 g. are preferred for complete inhibition and up to 12 g. may be needed for effective treatment. A typical cycle for full development of an adenovirus infection tends to be 6 or 7 days so that 1 dose a week should be effective prophylactically. Thus for humans a prophylactic dose between 500 mg. and 12 g. taken once a week should be effective though a preferred regimen would be to use a dose of 2 to 6 g. taken twice a week. For treatment a similar dose would be needed. As a maximum dose 200 mg./kg. body weight, and as a minimum dose 50 mg./kg. body weight can be recommended.

The compounds will be presented in pharmaceutical formulations for oral or parenteral use or in eye ointments. Preferably the compounds will be in a finely divided state. Representative examples of such formulations have already been described in British patent specification No. 975,357 and British Pat. 1,093,284, and U.S. Pat. No. 3,253,991.

Most published work on the compounds of this type has been on isatin β-thiosemicarbazone and N-methylisatin β-thiosemicarbazone and as the latter is more active against pox viruses than the unsubstituted isatin derivatives, this compound is used in the following description to illustrate how the activity can be detected.

Dilute substantially aqueous solutions of N-methylisatin β-thiosemicarbazone, hereinafter referred to as "methisazone solutions," were made by first of all dissolving the compound in dimethylformamide to make a concentrated solution and then adding this to distilled water, autoclaving the mixture and then adding Eagle growth medium.

In preliminary toxicity tests monolayers of HeLa cells were incubated in the presence of methisazone solution, then washed free of methisazone, infected with adenovirus 11 and incubated again. Further cultures were similarly infected and incubated but without having been pretreated with methisazone. Cells from each culture were then disrupted and the virus content in the supernatant fluid was determined by haemagglutinin titration with patas monkey red cells on perspex plates. Similar titres from each culture indicated that exposure of the HeLa cells to methisazone did not affect the cells' ability to support the multiplication of adenoviruses.

Similarly, uninfected HeLa cells were incubated in the presence of 40 μm. methisazone solution and then subcultured, the sub-cultures grew normally. It was concluded from these tests that methisazone was not toxic for HeLa cells at the concentrations employed and could be used for studies to detect anti viral activity.

Monolayers of HeLa cells were infected with adenovirus 11. Some cultures were incubated as controls and others were treated by adding various concentrations of methisazone solution followed by incubation. The cultures were then subjected to cycles of freezing and thawing to disrupt the cells and the virus contents of the supernatant fluids were determined by titrating the haemaggglutinin with patas monkey red cells. Concentrations of methisazone solution as low as 5 μm. reduced the virus titres by a five fold factor and 30μm. methisazone solution abolished the formation of haemagglutinin altogether.

Similar experiments were set up using adenovirus 3, 7, 9, 14, 16, 21 and 28; anti-viral activity was again observed.

Control experiments were also set up to show that reduction in haemagglutinin titres does correspond to a reduction in infective virus content; this was verified.

Attempts were made to determine the time during the growth cycle of adenovirus when methisazone acts. Cultures of HeLa cells infected with adenovirus 11 were established and incubated and different cultures were treated by the addition of 30 μm. methisazone solutions after varying time lags of uninterrupted incubation up to a period of 24 hours after infection. The cultures were then incubated for a further period of 18 hours after which the cells were disrupted and the haemagglutinin content of all the cultures determined. The results showed that production of haemagglutinin was completely inhibited when the addition of methisazone was delayed until 15 hours after infection. Increasing amounts of haemagglutinin appeared when the addition of the compound was delayed beyond this time. It therefore appears that methisazone acts at a late stage in the cycle when infective virus is just about to appear.

To detect activity against canine hepatitis it was necessary to use dog kidney cells instead of HeLa cells and to determine the reduction in infective virus directly instead of by the haemagglutinin reduction. The compounds were active.

Similar tests were carried out for many of the analogues of methisazone and a preliminary structure activity relationship of isatin β-thiosemicarbazone against the adenoviruses was established. This seemed to follow very closely that for the activity against pox viruses. Thus, for example, within the series of compounds of Formula I isatin β-thiosemicarbazone ($R^1$=H) was about half as active as N-methylisatin β-thiosemicarbazone ($R^1$=$CH_3$).

The preferred compounds for activity against adenoviruses are the β-thiosemicarbazones of 1-methylisatin, 1-ethylisatin, 1-allylisatin 1-2-hydroxyethylisatin, 1-hydroxymethylisatin, 1-2-acetoxyethylisatin, 1-acetylisatin, 5-fluoro-1-methylisatin, 5-fluoro-1-ethylisatin, 1,7-trimethyleneisatin, 1,7-diethylisatin, 1-acetoxymethylisatin, 1-2-bromoethylisatin, 5-fluoroisatin, 6-fluoroisatin, 7-fluoroisatin, 7-chlorisatin, 7-methylisatin, 7-fluoro-1-methylisatin, 7-fluoro-1-ethylisatin and 7-fluoro-1-allylisatin.

What is claimed is:

1. A method of treating adenovirus infections in mammals suffering from adenovirus infections, which comprises administering to a mammal a therapeutically effective amount of a compound selected from the class consisting of the β-thiosemicarbazones of 1-methylisatin, 1-ethylisatin, 1-allylisatin, 1-2-hydroxyethylisatin, 1-hydroxymethylisatin, 1-2-acetoxyethylisatin, 1-acetylisatin, 5-fluoro-1-methylisatin, 5-fluoro-1-ethylisatin, 1,7-trimethyleneisatin, 1,7-diethylisation, 1-acetoxymethylisatin, 1-2-bromoethylisatin, 5-fluoroisatin, 6-fluoroisatin, 7-fluoroisatin, 7-chloroisatin, 7-methylisatin, 7-fluoro-1-methylisatin, 7-fluoro-1-ethylisatin and 7-fluoro-1-allylisatin.

2. A method for treating adenovirus infections in mammals suffering from adenovirus infections, which comprises administering to a mammal a therapeutically effective amount of 1-methylisatin β-thiosemicarbazone.

3. A method according to claim 1, in which the mammal is a human being.

4. A method according to claim 2, in which the mammal is a human being.

References Cited

UNITED STATES PATENTS

| | | | |
|---|---|---|---|
| 3,253,991 | 5/1966 | Bauer et al. | 167—65.2 |

FOREIGN PATENTS

| | | | |
|---|---|---|---|
| 975,357 | 11/1964 | Great Britain | 167—65.2 |

OTHER REFERENCES

Andrewes: Viruses of Vertebrates, The Williams and Wilkins Company, Baltimore, Md., 1964, pages 183–193, 255–258.

JEROME D. GOLDBERG, Primary Examiner